(12) United States Patent
Brutch et al.

(10) Patent No.: US 9,774,657 B2
(45) Date of Patent: Sep. 26, 2017

(54) BROWSER ENGINE INTERFACING FOR ACCELERATED PHYSICS ENGINE

(71) Applicant: Samsung Electronics Co., Ltd., Suwon, Gyeonggi-do (KR)

(72) Inventors: Tasneem Brutch, Santa Clara, CA (US); Simon J. Gibbs, San Jose, CA (US); Chang Shu, Acton, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 781 days.

(21) Appl. No.: 13/888,220

(22) Filed: May 6, 2013

(65) Prior Publication Data

US 2013/0304791 A1 Nov. 14, 2013

Related U.S. Application Data

(60) Provisional application No. 61/646,215, filed on May 11, 2012.

(51) Int. Cl.
*H04L 29/08* (2006.01)
*G06F 9/54* (2006.01)
*G06F 17/30* (2006.01)

(52) U.S. Cl.
CPC .............. *H04L 67/10* (2013.01); *G06F 9/541* (2013.01); *G06F 9/547* (2013.01); *G06F 17/30867* (2013.01)

(58) Field of Classification Search
CPC .... G06F 9/541; G06F 9/547; G06F 17/30867; H04L 67/10
See application file for complete search history.

(56) References Cited

U.S. PATENT DOCUMENTS

| | | | | |
|---|---|---|---|---|
| 2008/0313648 | A1* | 12/2008 | Wang | G06F 21/53 719/315 |
| 2010/0017461 | A1* | 1/2010 | Kokkevis | G06F 9/44526 709/203 |
| 2010/0064324 | A1* | 3/2010 | Jenkin | H04N 21/443 725/59 |
| 2011/0320525 | A1* | 12/2011 | Agarwal | H04M 1/72561 709/203 |
| 2012/0185824 | A1* | 7/2012 | Sadler | G06F 9/548 717/120 |
| 2012/0304044 | A1* | 11/2012 | Leithead | G06F 9/541 715/205 |
| 2012/0304150 | A1* | 11/2012 | Leithead | G06F 9/541 717/115 |
| 2013/0055072 | A1* | 2/2013 | Arnold | G06T 15/503 715/240 |

(Continued)

OTHER PUBLICATIONS

Golubovic "WebGL implemention in Webkit based web browser on Android platform" TELFOR pp. 1139-1142.*

(Continued)

*Primary Examiner* — Charles E Anya
(74) *Attorney, Agent, or Firm* — Sherman IP LLP; Kenneth L. Sherman; Steven Laut (57) ABSTRACT

A method for application interfacing a native physics engine includes embedding access to a native physics engine within a browser engine. Bindings are provided for supporting multiple application classes from the browser engine to the native physics engine and a JavaScript engine.

26 Claims, 8 Drawing Sheets

(56) References Cited

U.S. PATENT DOCUMENTS

2013/0132840 A1\* 5/2013 Blas, Jr. .................. G06T 13/00
715/719
2015/0193286 A1\* 7/2015 Michael .................... G06F 8/31
719/313

OTHER PUBLICATIONS

Appmobi, "directBox2D", Jun. 21, 2012, 1 page, appmobi.com, USA.
Box2D, "Box2D: A 2D Physics Engine for Games", Mar. 28, 2013, 3 pages, box2d.org, USA.
Ando, Y., "Box2D: Js", Mar. 8, 2013, 3 pages, Yasushi Ando, USA.
Google Code, "box2dweb: Box2DFlash port to javascript", Jan. 17, 2013, 2 pages, Google, Inc., USA.

\* cited by examiner

BROWSER ENGINE INTERFACING FOR ACCELERATED PHYSICS ENGINE

CROSS-REFERENCE TO RELATED APPLICATION

This application claims the priority benefit of U.S. Provisional Patent Application Ser. No. 61/646,215, filed on May 11, 2012, incorporated herein by reference.

TECHNICAL FIELD

One or more embodiments generally relate to performance enhancement for Web gaming and physics simulation and, in particular, to a web browser interfacing for a hardware-accelerated physics engine.

BACKGROUND

Web-based technologies are a viable alternative to Java (Android) and Objective-C (iOS) for application development. There are, however, still areas where the web platform trails Android and iOS. Web platforms suffer low performance for compute and graphics intensive applications, such as gaming, physical simulation and dynamic visualization.

SUMMARY

One or more embodiments generally relate to interfacing a native physics engine. In one embodiment, access to a native physics engine is embedded within a browser engine. In one embodiment, bindings are provided for supporting a plurality of application classes from the browser engine to the native physics engine and a Javascript engine.

In one embodiment a non-transitory computer-readable medium having instructions which when executed on a computer perform a method comprising: providing bindings for supporting a plurality of application classes from a browser engine to a native physics engine and a Javascript engine.

In one embodiment, a browser engine comprises a webkit module. In one embodiment, a WebCore module uses a processor for providing bindings for supporting a plurality of application classes from the browser engine to a native physics engine and a Javascript core.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to interfacing a native physics engine. In one embodiment, access to a native physics engine is embedded within a browser engine. In one embodiment, bindings are provided for supporting a plurality of application classes from the browser engine to the native physics engine and a Javascript engine.

HTML5 is highly portable, familiar to an extremely large developer community, enables easy integration with web services, and is used for next generation platforms, such as Tizen, ChromeOS and Windows 8. Developers frequently cite application performance as a concern when considering web-based platforms, which is particularly true for gaming where there are both high compute and high graphics demands. Pure JavaScript implementation can be 2 to 10 times slower than "native" code.

For compute load of gaming applications, much time is spent in the "physics" code involved with object dynamics and physical simulation. One or more embodiments provide enhanced user experience for applications related to gaming, physical simulation, dynamic visual effects and animation, and physical realism in augmented reality applications by providing efficient access to JavaScript APIs, which bind to native efficient and performant implementation of 2D Physics Engine (Box2D). One or more embodiments allow users the access to efficient native implementation as JavaScript APIs for electronic devices (e.g., mobile phone device, tablet computing device, camera device, camcorder device, media device, laptop computing device, personal computing (PC) device, personal digital assistant (PDA) device, television device, etc.).

One or more embodiments provide a JavaScript interface to a native (open source) physics engine. In conjunction with WebGL, one or more embodiments provide web-based platforms for electronic devices with the compute and graphics power required for gaming, by enabling access to a native physics engine through JavaScript APIs.

Figure 1:
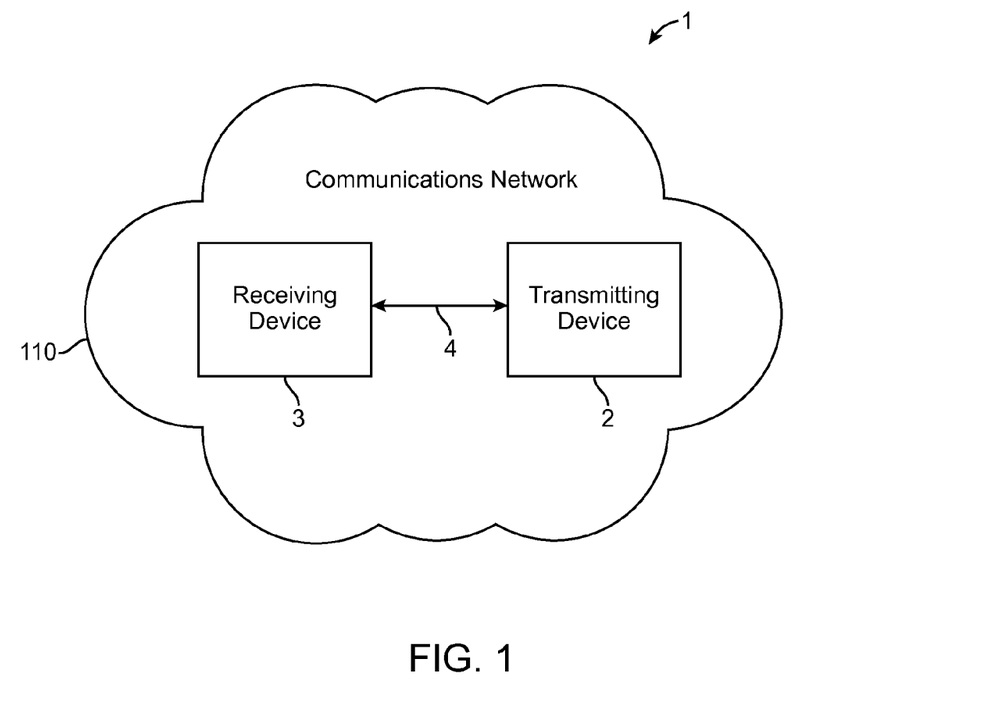
FIG. 1 shows a schematic view of a communications system, according to an embodiment.

FIG. 1 is a schematic view of a communications system, in accordance with one embodiment. Communications system 1 may include a communications device that initiates an outgoing communications operation (transmitting device 2)

and a communications network 110, which transmitting device 2 may use to initiate and conduct communications operations with other communications devices within communications network 110. For example, communications system 1 may include a communication device that receives the communications operation from the transmitting device 2 (receiving device 3). Although communications system 1 may include multiple transmitting devices 2 and receiving devices 3, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 2 and receiving device 3, when located within communications network 110, may communicate over a bidirectional communication path such as path 4, or over two unidirectional communication paths. Both the transmitting device 2 and receiving device 3 may be capable of initiating a communications operation and receiving an initiated communications operation.

The transmitting device 2 and receiving device 3 may include any suitable device for sending and receiving communications operations. For example, the transmitting device 2 and receiving device 3 may include a mobile telephone devices, television systems, cameras, camcorders, a device with audio video capabilities, tablets, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
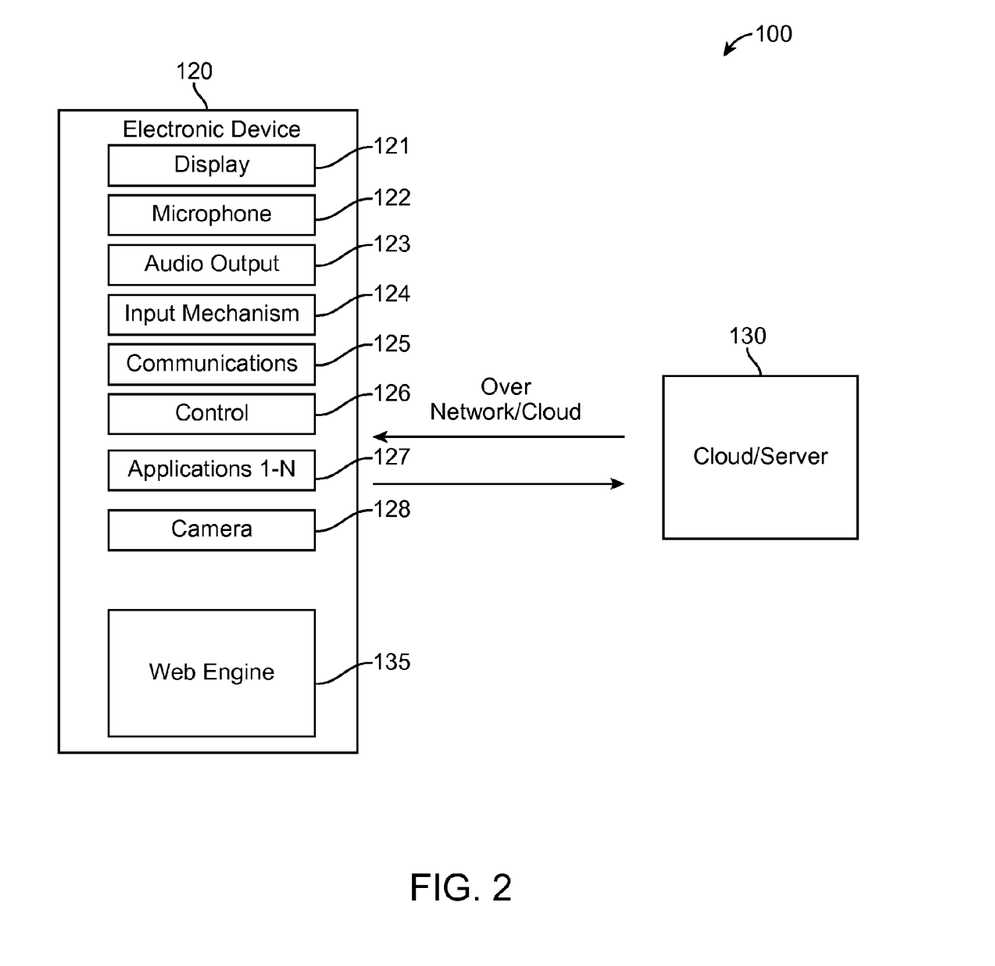
FIG. 2 shows a block diagram of an architecture system including a web engine that provides bindings for supporting a plurality of application classes, according to an embodiment.

FIG. 2 shows a functional block diagram of an architecture system 100 that may be used for providing JavaScript bindings to a native (open source) physics engine on an electronic device 120, according to an embodiment. Both the transmitting device 2 and receiving device 3 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a web engine module 135, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

In one embodiment, the web engine module 135 provides embedded access to an efficient native physics engine into a browser engine in the electronic device 120. In one embodiment, the web engine module 135 includes a JavaScript API implemented in a WebKit browser engine as a JavaScript binding for a 2D Physics Engine (e.g., Box2D).

Figure 3:
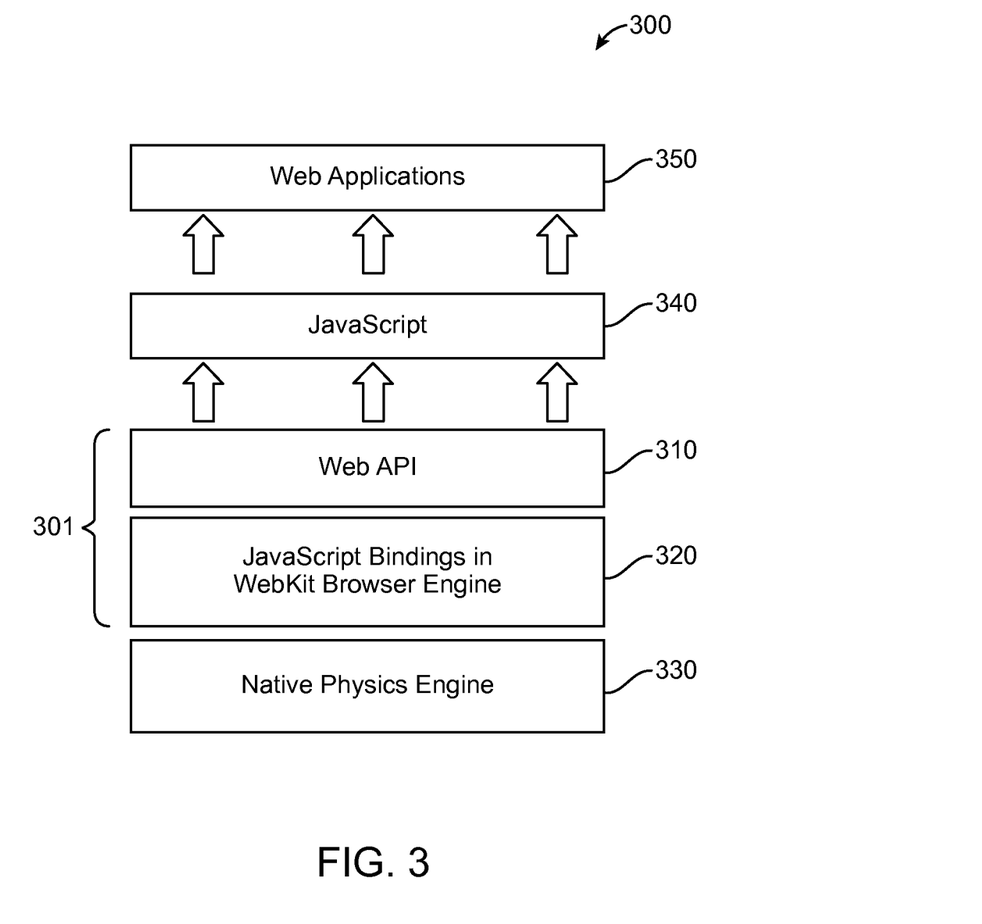
FIG. 3 shows a block diagram of high-level view of a system including a web engine, according to an embodiment.

FIG. 3 shows a block diagram of a high level view of a system 300 including a web engine (or WebCore) 301 of the web engine module 135 of the electronic device 120, according to an embodiment. In one embodiment, the system 300 comprises the web engine 301 including at least one Web API 310 and JavaScript bindings portion 320, a native physics engine 330 (e.g., Box2D), a JavaScript engine or core 340, and web applications 350.

In one embodiment, the web engine 301 provides transparent access from web applications 350 to the native physics engine 330 functionalities and APIs through JavaScript bindings from the JavaScript bindings portion 320 in the browser engine 301. In one embodiment, the transparent access from the web applications 350 to the native physics engine 330 provides performance gain, relative to a JavaScript-only implementation.

Figure 4:
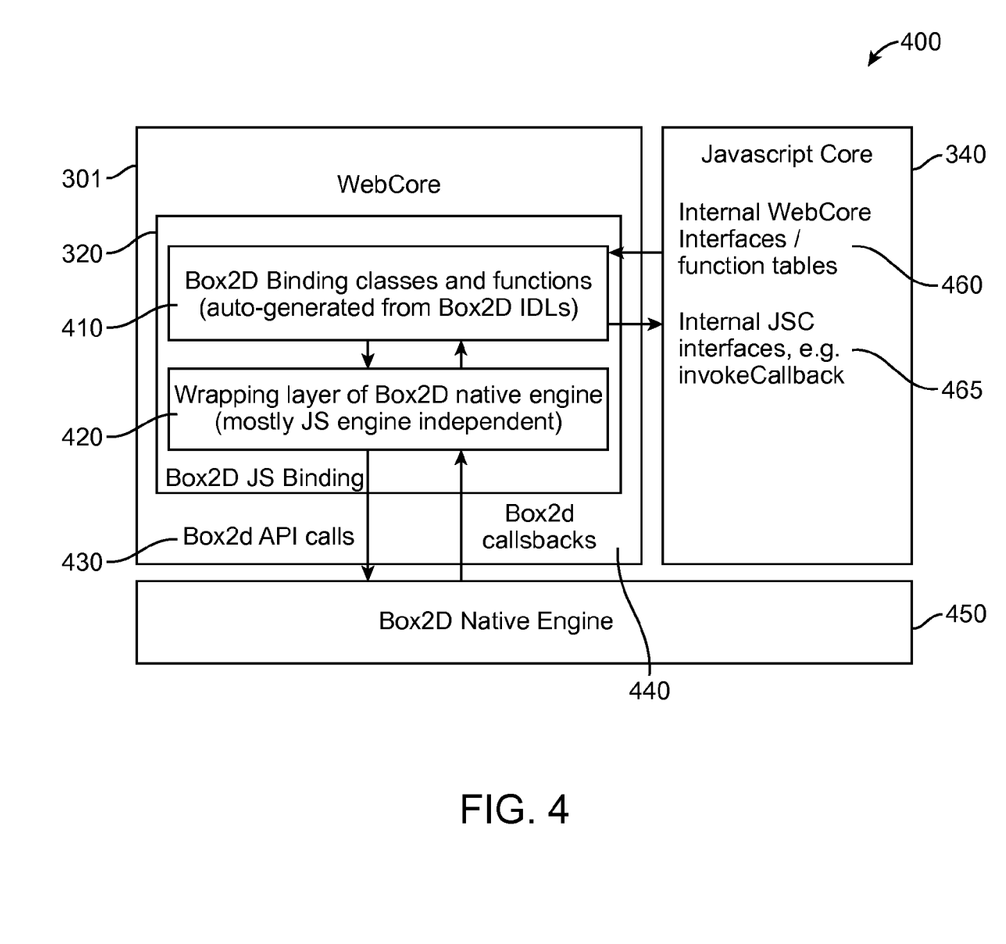
FIG. 4 shows a block diagram of a Box2D binding architecture, according to an embodiment.

FIG. 4 shows a block diagram of a Box2D binding architecture 400, according to an embodiment. In one embodiment, the Box2D binding architecture comprises the web engine 301, the JavaScript core 340 and a Box2D native engine 450. In one embodiment, the JavaScript bindings portion 320 for Box2D JavaScript bindings comprises a Box2D bindings generator module 410 and a wrapping or glue layer 420.

In one embodiment, the Box2D bindings generator module 410 provides Box2D binding classes and functions that may be automatically generated from Box2D Interface Definition Language (IDL) files (IDLs). In one embodiment, the wrapping layer 420 is mostly JavaScript engine 340 independent and provides a one-to-one mapping of Box2D native objects and wrapper objects for improving performance of web applications (e.g., web applications 350).

In one or more embodiments, the Box2D bindings generator module 410 includes an IDL code generator that supports constructor-type static read-only attributes in IDL (e.g., patch up-streamed to code based on WebKit.org). In one or more embodiments, the wrapping layer 420 supports general Box2D 2D Physics Engine classes, their functions, attributes and enums. In one or more embodiments, the wrapping layer 420 preserves Box2D tree structures. In one or more embodiments, the wrapping layer 420 supports Callback functions, such as Listeners. In one or more embodiments, the wrapping layer 420 supports debug draw and supports unusual data types (e.g., void).

In one embodiment, the Box2D bindings generator module 410 generates the binding classes and functions for Box2D and communicates these to the wrapping layer 420 that provides the mapping and Box2D API calls 430 to the Box2D native engine 450. In one embodiment, the Box2D native engine 450 communicates back to the wrapping layer 420 with Box2D callbacks 440, which are mapped and communicated to the Box2D bindings generator module 410. In one embodiment, the Box2D bindings generator module 410 communicates internal JavaScript interfaces 465 (e.g., invokeCallback) to the JavaScript engine 340. In one embodiment, the JavaScript engine 340 communicates internal WebCore interfaces/function tables 460 to the Box2D bindings generator module 410.

Figure 5:
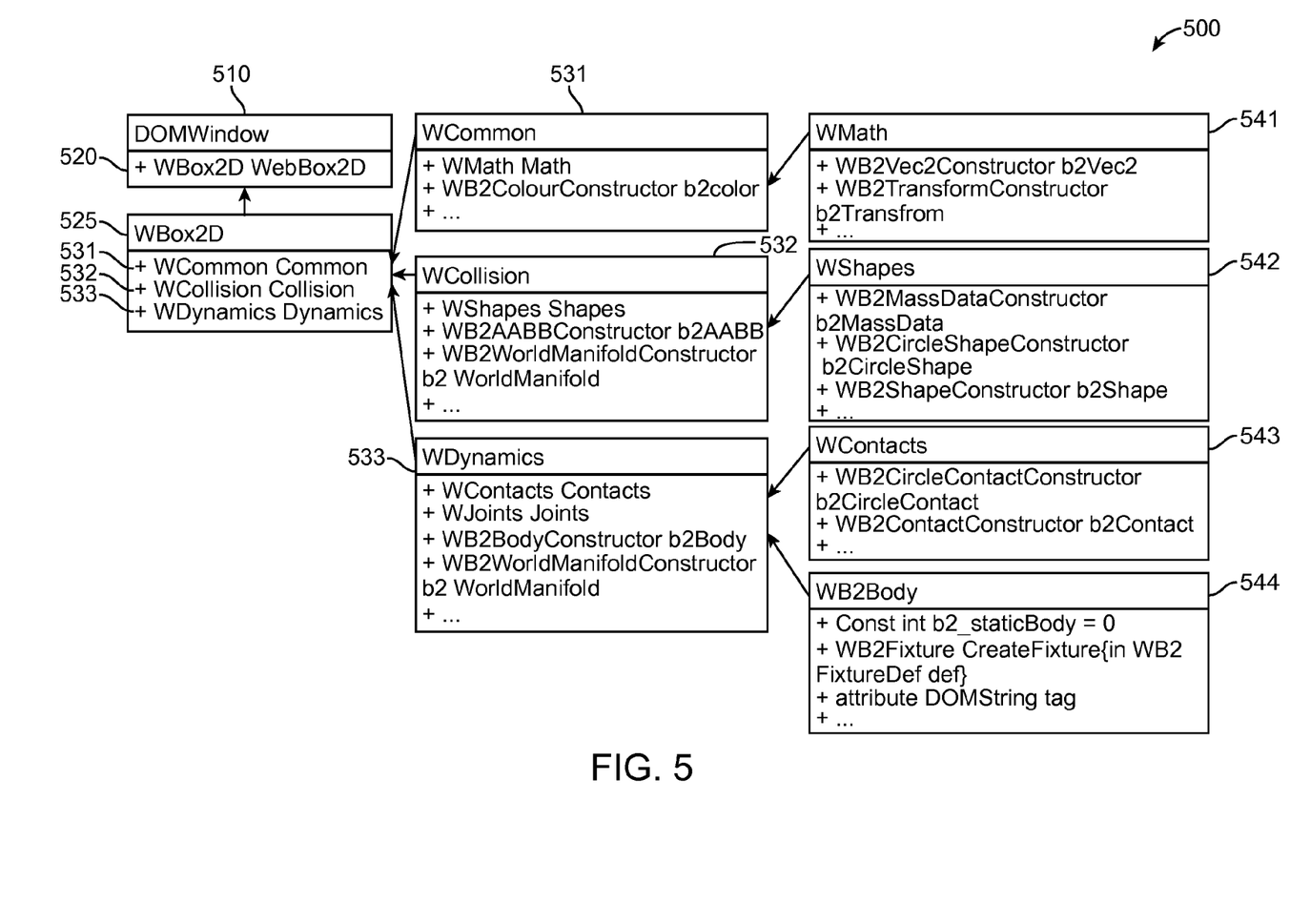
FIG. 5 shows an example binding class diagram, according to an embodiment.

FIG. 5 shows an example binding class diagram 500, according to an embodiment. In one example embodiment, the example binding class diagram 500 includes binding classes supported in an example WebKit implementation. As illustrated in FIG. 5, in one example embodiment, the class tree comprises the document object module (DOM) Window (DOMWindow) 510 that includes a WBox2D class 520 having WebBox2D objects. In one example embodiment, the WBox2D class 525 comprises objects for a WCommon class 531 that includes common objects, a WCollision class 532 having collision objects, and a WDynamics class 533 having dynamics objects.

In one example embodiment, the WCommon class 531 includes objects, such as Wmath with Math objects, which also has a tree structure with Wmath class 541 and the associated objects. In one example embodiment, the WCollision class 532 includes objects, such as WShapes with Shape objects, which also has a tree structure with WShapes class 542 and the associated objects. Similarly, in one example embodiment, the WDynamics class 533 includes objects, such as WContacts with Contact objects, and WB2Body Constructor, which also have tree structures with WContacts class 543 and WB2Body class 544, and the respective associated objects. As seen in FIG. 5, the tree structure of the binding class diagram 500 may expand outward until the classes and objects are exhausted.

In one embodiment, the IDL code generator of the Box2D bindings generator module 410 (FIG. 4) generates CPP/H filed based on IDL files. In one embodiment, the following is an example of IDL pseudo-code as an input for the Box2D bindings generator module 410:

```
pseudo IDL file:
module Box2D {
    interface [
    Constructor,
    InterfaceName=b2Class1
    ] WB2Class1 {
    typeA f1(in typeB p1);
    attribute typeC a1;
    };
}
pseudo glue cpp/h file:
class WB2Class1 {
Public:
    //creator
    WB2Class1* create( );
    //functions
    double f1(WB2Class2* p1);
    //attributes
    WB2Class3* a1( ) const;
    void setA1(const WB2Class3* v);
    b2Class1* m_p;
private:
    WB2Class1( );
};
WB2Class1* WB2Class1::create( )
{
    return new WB2Class1( );
}
WB2Class1::WB2Class1( )
{
    m_p = new b2Class1( );
}
double WB2Class1::f1(WB2Class2* p1)
{
    return m_p->f1(p1->m_p);
}
WB2Class3* a1( ) const
{
    return WB2Class3::create(m_p->a1);
}
void setA1(const WB2Class3* v)
{
    m_p->a1 = v->m_p;
}
```

In one embodiment, an example of pseudo-code for a web application (e.g., FIG. 3, web application 350) comprises the following:

```
pseudo code in web application:
function test( ) {
    var obj1 = new b2Class1( );
    var obj2 = new b2Class2( );
    var obj3 = new b2Class3( );
    var num = obj1.f1(obj2);
    obj1.a1 = obj3;
}
```

Figure 6:
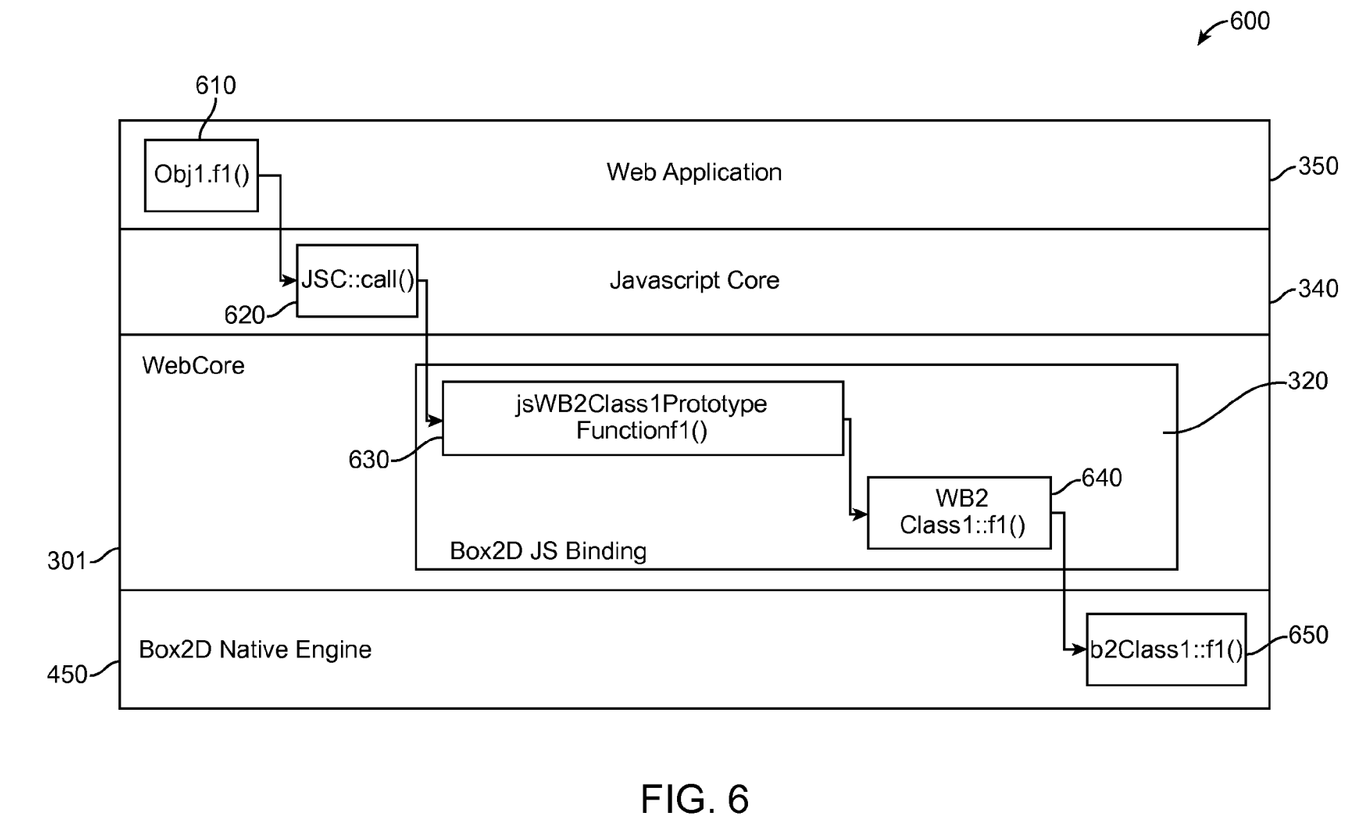
FIG. 6 shows a functional call flow diagram, according to an embodiment.

FIG. 6 shows a functional call flow diagram 600, according to an embodiment. In one embodiment, the functional flow starts from the web application 350. In one example, embodiment, with reference to the pseudo-code for the web application listed above, when 'obj1.f1' 610 is called, the JavaScript engine 340 (JavascriptCore) triggers a function call JSC::call( ) 620 that calls into a function in the WebCore 301, for example function 'jsWB2Class1PrototypeFunctionf1' 630 in the auto-generated component (e.g., from the Box2D bindings generator module 410) through a table (e.g., a hash table, or similar structure) where key "f1" is mapped to this function. In one example, embodiment, the function jsWB2Class1PrototypeFunctionf1 630 then calls the wrapper/glue layer 420 function 'WB2Class1::f1' 640, which further calls the native function 'b2Class1::f1' 650 from the Box2D native engine 450.

Figure 7A:
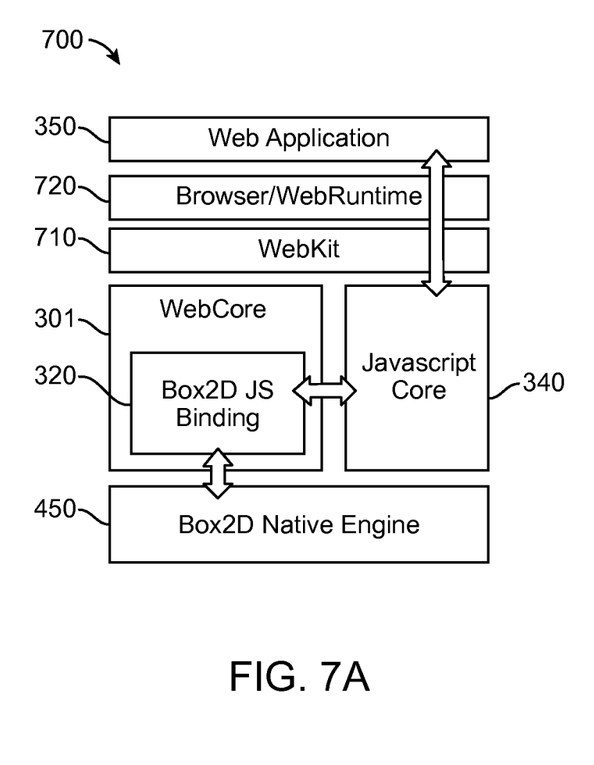
FIG. 7A shows a block diagram of an architecture for JavaScript bindings for Box2D, according to an embodiment.
Figure 7B:
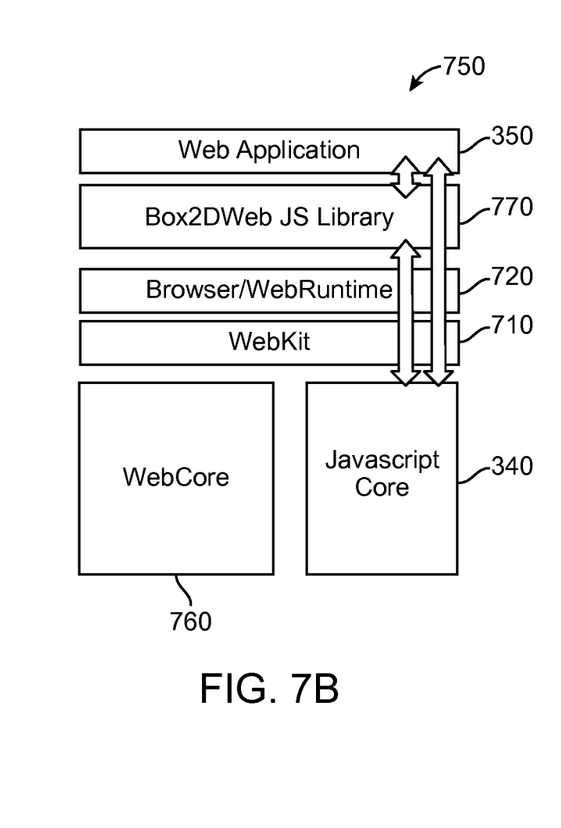
FIG. 7B shows a block diagram of an example Box2DWeb architecture.

FIG. 7A shows a block diagram of an architecture 700 for JavaScript bindings for Box2D, according to an embodiment. FIG. 7B shows a block diagram of an example Box2DWeb architecture 750. In one or more embodiments, the architecture 700 comprises the web application 350, a web engine including browser/WebRuntime module 720, WebKit 710 and WebCore 301 including (Box2D) JavaScript bindings portion 320, the JavaScript engine 340 and the Box2D native engine 450.

The Box2DWeb architecture 750 includes the web application 350, a Box2DWeb JavaScript library module 770, a browser/WebRuntime 720, a WebKit 710, a WebCore 760 and JavaScript engine 340. The Box2DWeb architecture 750 is a JavaScript implementation of 2D Physics Engine (Box2DWeb) and provides a very inefficient architecture as compared to the one or more embodiments of the architecture 700 for JavaScript bindings for Box2D (Web Physics) implementation. One or more embodiments implementing the architecture 700 for JavaScript bindings for Box2D provides efficient access from web applications (e.g., Web application 350) to the Box2D native physics engine 450 by implementing JavaScript bindings for a 2D Physics engine (Box2D) using JavaScript APIs.

Figure 8:
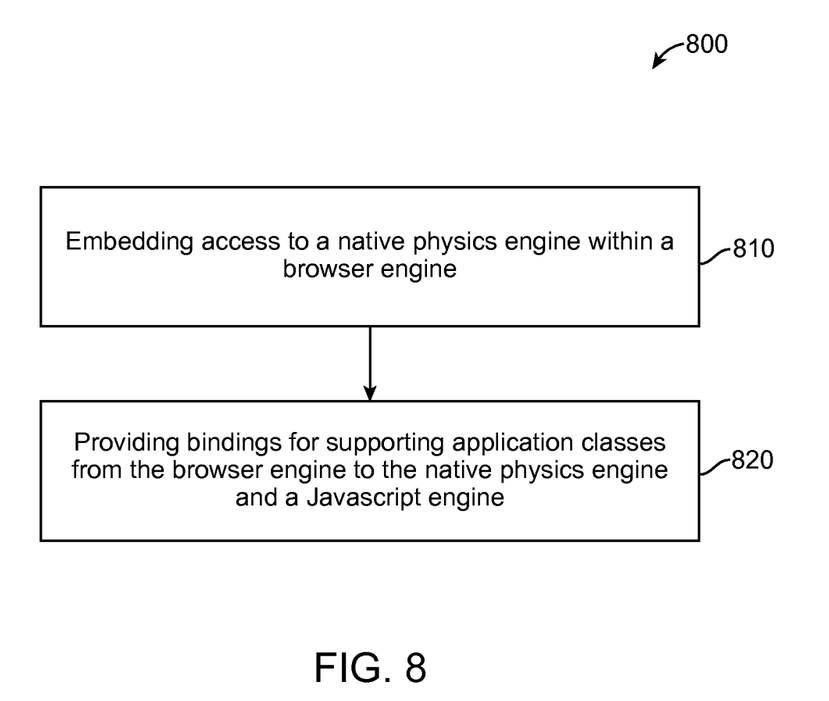
FIG. 8 shows a flowchart for application interfacing a native physics engine, according to an embodiment.

FIG. 8 shows a flowchart process 800 for application interfacing a native physics engine, according to an embodiment. In one embodiment, in block 810 of process 800 embeds access to a native physics engine (e.g., FIG. 3, native physics engine 330; FIG. 4, Box2D native engine 450) within a browser engine (e.g., FIG. 2, web engine module 135; FIGS. 3 and 4, web engine 301) of an electronic device (e.g., FIG. 2, electronic device 120). In one embodiment, in block 820, bindings for supporting application classes from the browser engine to the native physics engine and a Javascript engine (e.g., FIGS. 3 and 4, JavaScript engine 340) are provided.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for application interfacing a native physics engine, comprising:
    embedding access to the native physics engine within a WebCore of a browser engine by providing JavaScript bindings within the WebCore for supporting a plurality of application classes from the browser engine to the native physics engine and to a JavaScript engine;
    triggering, by the JavaScript engine, a function that calls into a corresponding JavaScript binding function of the WebCore through a table, the corresponding JavaScript binding function calling a wrapper layer function in the JavaScript binding that calls a native function from the native physics engine; and
    providing, by the WebCore of the browser engine, transparent access from at least one web application to the native physics engine through the JavaScript bindings.

2. The method of claim 1, further comprising:
    providing general support for native physics engine: classes, class functions, attributes and enums using a wrapper layer.

3. The method of claim 1, wherein the JavaScript bindings are generated using an interface definition language (IDL) generator that supports constructor-type static read-only attributes.

4. The method of claim 2, wherein the wrapper layer preserves tree structures of Box2D data structures.

5. The method of claim 4, wherein document object model (DOM) window objects are mapped using a tree structure.

6. The method of claim 5, wherein the wrapper layer supports a one-to-one mapping of native objects and wrapper objects.

7. The method of claim 6, wherein the wrapper layer supports callback functions and debug functions.

8. The method of claim 1, wherein the JavaScript bindings are communicated from the WebCore of the browser engine using Box2D application programming interface (API) calls to a Box2D native engine and using Box2D callbacks from the Box2D native engine, and the table includes a key that is mapped to the JavaScript binding function.

9. The method of claim 8, wherein the JavaScript bindings comprise Box2D JavaScript bindings, and the WebCore communicates directly with the JavaScript engine.

10. A non-transitory processor-readable medium that includes a program that when executed by a processor performs a method comprising:
    providing JavaScript bindings within a WebCore of a browser engine for supporting a plurality of application classes from the browser engine to a native physics engine and to a JavaScript engine;
    triggering, by the JavaScript engine, a function that calls into a corresponding JavaScript binding function of the WebCore through a table, the corresponding JavaScript binding function calling a wrapper layer function in the JavaScript binding that calls a native function from the native physics engine; and
    providing, by the WebCore of the browser engine, transparent access from at least one web application to the native physics engine through the JavaScript bindings.

11. The non-transitory processor-readable medium of claim 10 that includes a program that when executed by the processor performs the method further comprising:
    providing general support for native physics engine: classes, class functions, attributes and enums using a wrapper layer.

12. The non-transitory processor-readable medium of claim 11, wherein the JavaScript bindings are generated using an Interface Definition Language (IDL) generator that supports constructor-type static read-only attributes.

13. The non-transitory processor-readable medium of claim 12, wherein the wrapper layer preserves tree structures of Box2D data structures.

14. The non-transitory processor-readable medium of claim 13, wherein Document Object Model (DOM) window objects are mapped using a tree structure.

15. The non-transitory processor-readable medium of claim 14, wherein the wrapper layer supports a one-to-one mapping of native objects and wrapper objects.

16. The non-transitory processor-readable medium of claim 15, wherein the wrapper layer supports callback functions and debug functions.

17. The non-transitory processor-readable medium of claim 10, wherein the JavaScript bindings are communicated from the WebCore of the browser engine using Box2D application programming interface (API) calls to a Box2D native engine and using Box2D callbacks from the Box2D native engine.

18. The non-transitory processor-readable medium of claim 17, wherein the JavaScript bindings comprise Box2D JavaScript bindings, and the WebCore communicates directly with the JavaScript engine.

19. A client device comprising:
a memory storing a JavaScript engine and a browser engine, the browser engine comprising a WebKit and a WebCore that includes embedded JavaScript bindings;
a processor configured to:
execute the WebCore to support a plurality of application classes from the browser engine directly to a native physics engine and to a JavaScript Core, and to provide transparent access from at least one web application to the native physics engine through the JavaScript bindings; and
execute the JavaScript engine to trigger a function that calls into a corresponding JavaScript binding function of the WebCore through a table, and to cause the corresponding JavaScript binding function to call a wrapper layer function in the JavaScript binding that calls a native function from the native physics engine.

20. The client device of claim 19, wherein the WebCore provides general support for the native physics engine: classes, class functions, attributes and enums.

21. The client device of claim 19, wherein the processor is further configured to generate the JavaScript bindings using an Interface Definition Language (IDL) generator that supports constructor-type static read-only attributes.

22. The client device of claim 19, wherein the processor is further configured to execute the WebCore to map Document Object Model (DOM) window objects are mapped using a tree structure.

23. The client device of claim 22, wherein the processor is further configured to execute the WebCore to support a one-to-one mapping of native objects and wrapper objects.

24. The client device of claim 23, wherein processor is further configured to execute the WebCore to support callback functions and debug functions.

25. The client device of claim 19, wherein the processor is further configured to execute the WebCore to communicate the JavaScript bindings from the WebCore using application programming interface (API) calls to the native physics engine and using callbacks from the native physics engine.

26. The client device of claim 25, wherein the JavaScript bindings comprise Box2D JavaScript bindings.

* * * * *